United States Patent
Hebert et al.

(10) Patent No.: US 9,617,897 B2
(45) Date of Patent: Apr. 11, 2017

(54) INTEGRATED FUNCTIONAL HEAT EXCHANGE APPARATUS FOR AUTOMOBILE

(71) Applicant: Halla Visteon Climate Control Corp., Daejeon (KR)

(72) Inventors: Guillaume Hebert, Za Radnici (CZ); Zbynek Stranak, Na Pozare (CZ); Jiri Bazala, Korytna (CZ)

(73) Assignee: HANON SYSTEMS, Daejeon-si (KR)

( * ) Notice: Subject to any disclaimer, the term of this patent is extended or adjusted under 35 U.S.C. 154(b) by 0 days.

(21) Appl. No.: 14/766,800

(22) PCT Filed: Dec. 9, 2014

(86) PCT No.: PCT/KR2014/012073
§ 371 (c)(1),
(2) Date: Aug. 10, 2015

(87) PCT Pub. No.: WO2015/088224
PCT Pub. Date: Jun. 18, 2015

(65) Prior Publication Data
US 2016/0290205 A1    Oct. 6, 2016

(30) Foreign Application Priority Data

Dec. 10, 2013  (KR) .................... 10-2013-0153413

(51) Int. Cl.
*F01N 3/02*  (2006.01)
*F01N 5/02*  (2006.01)
(Continued)

(52) U.S. Cl.
CPC .............. *F01N 5/02* (2013.01); *F01M 5/001* (2013.01); *F02G 5/02* (2013.01); *F02M 26/14* (2016.02);
(Continued)

(58) Field of Classification Search
CPC ....... F01N 3/0205; F01N 3/043; F02M 26/15; F02M 26/25; F02M 26/44; F28D 9/0093
See application file for complete search history.

(56) References Cited

U.S. PATENT DOCUMENTS 4,685,430 A  *  8/1987  Ap ......................... F01M 5/00
                                                         123/142.5 R
6,155,042 A  *  12/2000  Perset ................... F01N 3/043
                                                         123/568.12
(Continued)

FOREIGN PATENT DOCUMENTS

JP         11-193753         7/1999
JP        2011047305 A       3/2011
(Continued)

*Primary Examiner* — Jonathan Matthias
(74) *Attorney, Agent, or Firm* — Fraser Clemens Martin & Miller LLC; James D. Miller

(57) ABSTRACT

A heat exchange device with combined functions in vehicles includes: a heat exchanger configured to be installed in an exhaust path of an engine and connected to a coolant heat exchanger circuit and an oil heat exchanger circuit; a bypass path configured to be connected to bypass the heat exchanger in the exhaust path; a recirculation path configured to be branched from the exhaust path to be connected to an intake system of the engine; a first control valve configured to control a flow path of exhaust gas between the exhaust path and the bypass path; a second control valve configured to control a flow path of the exhaust gas between the exhaust path and the recirculation path; and a third control valve configured to control the flow path of the exhaust gas between the bypass path and the recirculation path.

10 Claims, 10 Drawing Sheets

(51) Int. Cl.
*F02G 5/02* (2006.01)
*F01M 5/00* (2006.01)
*F28D 7/00* (2006.01)
*F02M 26/14* (2016.01)
*F02M 26/32* (2016.01)
*F28F 1/42* (2006.01)
*F28D 7/06* (2006.01)
*F28D 7/16* (2006.01)
*F28D 9/00* (2006.01)
*F28D 21/00* (2006.01)

(52) U.S. Cl.
CPC ........... *F02M 26/32* (2016.02); *F28D 7/0066* (2013.01); *F28D 9/0093* (2013.01); *F01N 2240/36* (2013.01); *F28D 7/06* (2013.01); *F28D 7/16* (2013.01); *F28D 9/0012* (2013.01); *F28D 9/0056* (2013.01); *F28D 21/0003* (2013.01); *F28D 2021/008* (2013.01); *F28D 2021/0089* (2013.01); *F28D 2021/0094* (2013.01); *F28F 1/426* (2013.01); *F28F 2210/06* (2013.01); *Y02T 10/16* (2013.01); *Y02T 10/166* (2013.01)

(56) References Cited

U.S. PATENT DOCUMENTS

2011/0131961 A1* 6/2011 Lee ................. F01M 5/001
                                                        60/320
2014/0251579 A1* 9/2014 Sloss ................ F01N 5/02
                                                         165/96

FOREIGN PATENT DOCUMENTS

| | | |
|---|---|---|
| JP | 2012107599 A | 6/2012 |
| JP | 2013532788 A | 8/2013 |
| KR | 1020110062821 | 6/2011 |
| KR | 1020130012998 A | 2/2013 |
| KR | 20130069820 A | 6/2013 |

\* cited by examiner

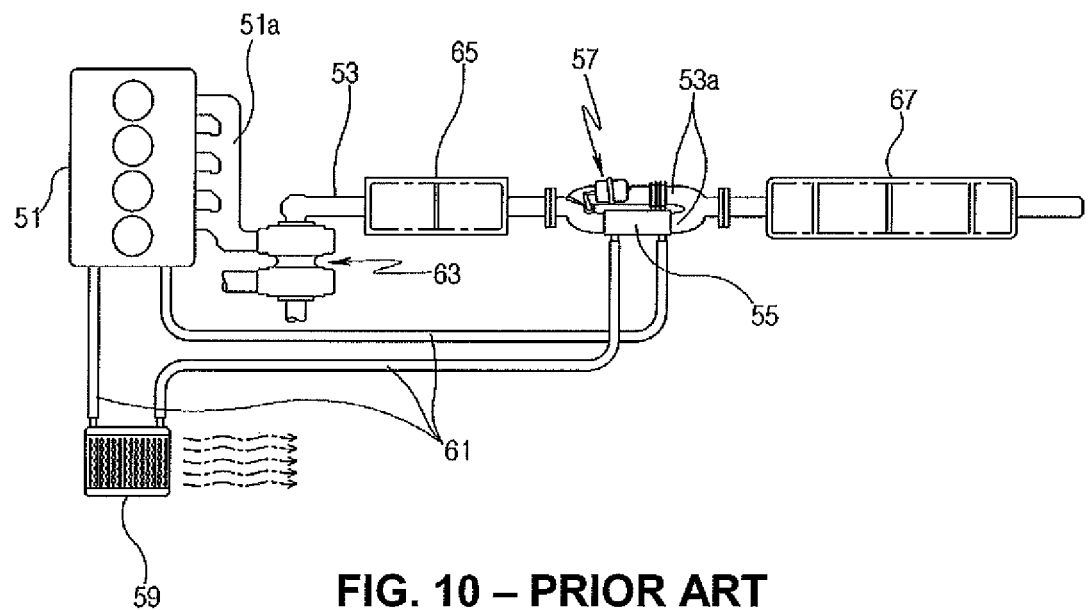
FIG. 10 – PRIOR ART

INTEGRATED FUNCTIONAL HEAT EXCHANGE APPARATUS FOR AUTOMOBILE

CROSS-REFERENCE(S) TO RELATED APPLICATIONS

This patent application is a United States national phase patent application based on PCT/KR2014/012073 filed on Dec. 9, 2014, which claims the benefit of Korean Patent Application No. 10-2013-0153413 filed on Dec. 10, 2013. The disclosures of the above patent applications are hereby incorporated herein by reference in their entirety.

BACKGROUND OF THE INVENTION

Technical Field

The present invention relates to a heat exchange device with combined functions in vehicles, and more particularly, to a heat exchanger with combined functions in vehicles capable of improving assembling workability and economic efficiency by integrating a heat exchanger of an exhaust gas recirculation, a heat exchanger of a water-cooled oil cooler, and a heat exchanger of an exhaust heat recovery system in a single package and appropriately disposing an exhaust path of exhaust gas and flow paths for coolant and oil, respectively, to meet these heat exchangers to publicly use related parts.

Background Art

Generally, an example of an apparatus using a heat source of exhaust gas generated after combustion of an engine in a vehicle may largely include an exhaust gas recirculation (EGR), a water-cooled oil cooler, an exhaust heat recovery system (EHRS), a heater, etc.

First, the exhaust gas recirculation needs to include a cooler for cooling a high-temperature heat source of exhaust gas, in which the cooler needs to satisfy laws on regulations of exhaust gas. Further, the water-cooled oil cooler radiates heat from oil of the engine and/or a transmission to appropriately cool facilities.

Further, the exhaust heat recovery system is to heat engine coolant, engine oil, transmission oil, or a cabin and implements an effect of improving convenience of passengers, reducing fuel consumption, and lowering emission of carbon dioxide.

For example, as illustrated in FIG. 10, the typical exhaust heat recovery system includes an exhaust conduit 53 configured to be communicately connected to an exhaust system 51a of an engine 51 as a single flow path, branch conduits 53a configured to be connected to the exhaust conduit 53 while being branched in parallel, a heat exchanger 55 configured to be installed to be limited to any one specific conduit of the branch conduits 53a, a bypass valve 57 configured to be installed to control the flow path of the exhaust gas discharged via the branch conduits 53a, a heat core 59 configured to heat an inner space of a cabin, and a connection conduit 61 configured to be installed to communicate between the heat core 59 and the heat exchanger 55. In the drawings, reference numeral 63 is a turbo charger installed in the exhaust conduit 53, reference numeral 65 is a catalytic converter in the exhaust conduit 53 at a rear end of the turbo charger 63, and reference numeral 67 is a muffler installed at a distal end of the exhaust conduit 53.

However, in connection with all of the typical exhaust gas recirculation using waste heat of the exhaust gas, water-cooled oil cooler, exhaust heat recovery system, and heater, facilities for exchanging heat with the exhaust gas needs to be individually constructed and therefore a space problem is caused and parts for the conduits need to be additionally installed to secure the flow paths for each fluid, and therefore the economic burden may be increased.

DISCLOSURE

Technical Problem

An object of the present invention is to provide a heat exchange device with combined functions in vehicles capable of publicly using related parts, improving assembly workability, and saving economic costs required to construct facilities by integrating heat exchangers individually installed in each facility for an exhaust gas recirculation, a water-cooled oil cooler, and an exhaust heat recovery system, respectively, in a single package.

Another object of the present invention is to construct flow paths for exhaust gas, coolant, and oil for communicating with each facility for each heat exchanger integrated in a single package in an optimal state and automatically control an opening and closing degree of each flow path to meet an operation condition of an engine to greatly improve operation efficiency of the overall system, to thereby lower fuel consumption and remarkably reduce emission of harmful components.

Technical Solution

A heat exchange device with combined functions in vehicles, including: a heat exchanger configured to be installed in an exhaust path of an engine and connected to a coolant heat exchanger circuit and an oil heat exchanger circuit; a bypass path configured to be connected to bypass the heat exchanger in the exhaust path; a recirculation path configured to be branched from the exhaust path to be connected to an intake system of the engine; a first control valve configured to control a flow path of exhaust gas between the exhaust path and the bypass path; a second control valve configured to control a flow path of the exhaust gas between the exhaust path and the recirculation path; and a third control valve configured to control the flow path of the exhaust gas between the bypass path and the recirculation path.

The exhaust path may include an inflow path configured to extend from the engine to the heat exchanger and an outflow path configured to extend from the heat exchanger to a tail pipe, and the bypass path may be branched to be reached from the inflow path to the outflow path.

The first control valve may be installed at a branched point between the inflow path and the bypass path and the second control valve may be installed at a branched point between the outflow path and the recirculation path.

The recirculation path may include a main recirculation path configured to be branched from the outflow path and a sub recirculation path configured to be branched so as to be reached from the bypass path to the main recirculation path, the second control valve may be installed at a branched point between the outflow path and the main recirculation path, and the third control valve may be installed at a branched point between the bypass path and the sub recirculation path.

The heat exchanger may include exhaust connection parts configured to provide an inflow and an outflow of the exhaust gas, coolant connection parts configured to provide an inflow and an outflow of coolant, and oil connection parts configured to provide an inflow and an outflow of oil, and the heat exchanger may further includes a first core unit configured to be connected to the coolant heat exchanger circuit and a second core unit configured to be connected to the oil heat exchanger circuit.

The first core unit and the second core unit may be each disposed inside and outside a concentric circle and the exhaust connection parts may be finished by an end cap having an edge portion integrated with a flange while being formed at a bottom portion of the first core unit, the coolant connection parts may be installed at left and right ends of an outer side of the second core unit, and the oil connection parts may be each installed at portions spaced apart from the coolant connection parts with respect to the second core unit.

The first core unit and the second core unit may be each disposed in a laminar shape in a vertical direction, and the exhaust connection parts may be finished by an end cap while being formed at left/right ends of the first core unit, the coolant connection parts may be each installed at a lower portion of the first core unit and an upper portion of the second core unit, and the oil connection parts may be each installed at portions spaced apart from each other with respect to the second core unit, Advantageous Effects According to the exemplary embodiments of the present invention, the heat exchangers individually required to build the facilities for the exhaust gas recirculation, the water-cooled oil cooler, and the exhaust heat recovery system of the vehicle may be integrated in the single package to publicly use the related parts, thereby improving the economic efficiency and greatly improving the assembly workability of parts. In particular, the paths individually required in the configuration of each facility may be integrally disposed to meet the single package to greatly reduce the occupied space at the time of disposing various kinds of parts in the engine room, to thereby efficiently use the limited space.

Further, according to the exemplary embodiments of the present invention, the flow paths for exhaust gas, coolant, and oil for communicating with each facility for heat exchangers integrated in the single package may be constructed in the optimal state and the opening and closing degree of each flow path may be automatically controlled to meet the operation condition of the engine to greatly improve the operation efficiency of the overall system, to thereby lower the fuel consumption and remarkably reduce the content of carbon dioxide corresponding to harmful components included in the exhaust gas discharged into the atmosphere.

DESCRIPTION OF THE DRAWINGS

FIG. 10 is a diagram schematically illustrating a configuration of the typical exhaust heat recovery system.

EXPLANATION OF MAIN REFERENCE NUMERALS OF THE DRAWINGS

10—Engine 12—Exhaust path
12a—Inflow path 12b—Outflow path
14—Heat exchanger 16—Bypass path
18—Recirculation path 18a—Main recirculation path
18b—Sub recirculation path 20—First control valve
22—Second control valve 24—Third control valve
26—First core unit 28—Second core unit
30—Coolant connection part 32—Oil connection part
34—End cap 34a—Flange

BEST MODE

Hereinafter, exemplary embodiments of the present invention will be described in detail with reference to the accompanying drawings.

Figure 1:
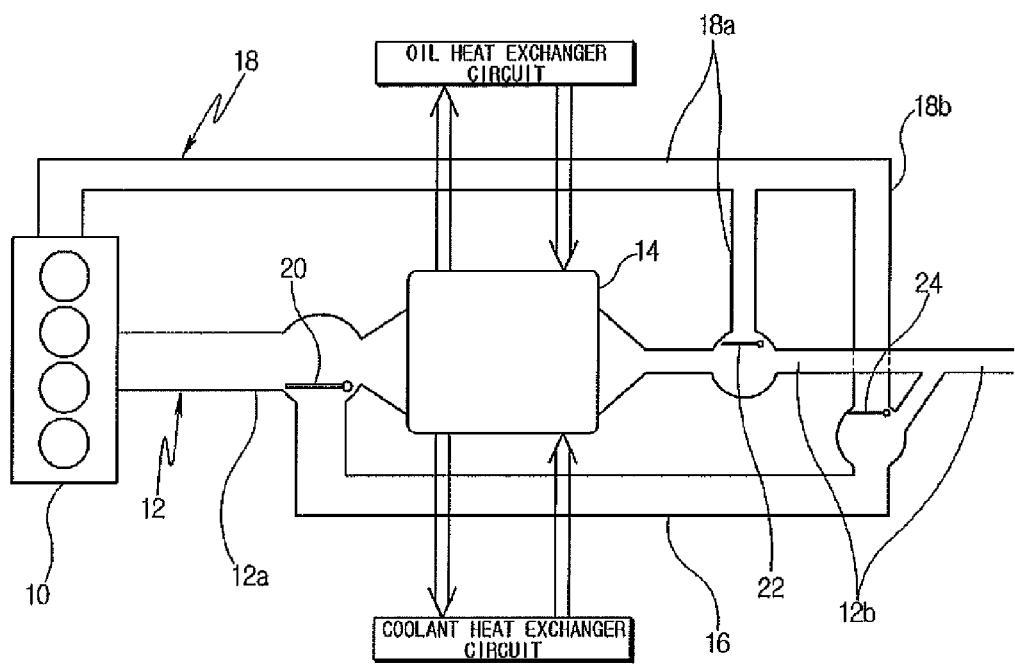
FIG. 1 is a diagram schematically illustrating an overall configuration of a heat exchange device with combined functions in vehicles according to an exemplary embodiment of the present invention.

Referring to FIG. 1, an engine 10 includes an exhaust path 12 which is connected to an exhaust system to join exhaust gas generated from each cylinder after combustion to a single path and discharges the exhaust gas into the atmosphere. The heat exchanger 14 is installed in the exhaust path 12 for independently exchanging heat with coolant of the engine 10 and oil of the engine 10 and/or the transmission (not illustrated) by using waste heat from the exhaust gas. That is, the heat exchanger 14 serves to recover high-temperature waste heat of the exhaust gas discharged via the exhaust path 12.

For this purpose, the exhaust path 12 is configured to include an inflow path 12a extending from the engine 12 to a front end of the heat exchanger 14 and an outflow path 12b extending from a rear end of the heat exchanger 14 to a tail pipe (not illustrated). That is, the exhaust path 12 may be divided into the inflow path 121 which is positioned at a front portion around the heat exchanger 14 to directly communicate with the exhaust system of the engine 10 and the outflow path 12b which is positioned at a rear end around the heat exchanger 14 to directly communicate with the tail pipe.

Further, the heat exchanger 14 separately includes a coolant heat exchanger circuit which guides a flow of coolant for exchanging heat between the exhaust gas and the coolant and an oil heat exchanger circuit which guides a flow of oil for exchanging heat between the coolant and the oil.

The bypass path 16 is installed to bypass the heat exchanger 14 in the exhaust path 12, such that the exhaust gas discharged after combustion of the engine 10 may be directly discharged into the atmosphere via a muffler, and not via the heat exchanger 14. That is, the bypass path 16 is branched from the inflow path 12a of the exhaust path 12 to directly communicate with the outflow path 12b of the exhaust path 12, such that the exhaust gas generated after the combustion of the engine 10 may be discharged by bypassing the heat exchanger 14, and not passing through the heat exchanger 14.

The recirculation path 18 is branched from the exhaust path 12 to be connected to an intake path (not illustrated) of the engine 10, such that the exhaust gas discharged from the engine 10 goes through a series of recirculation processes to be again supplied into a combustion chamber through the intake system. That is, the recirculation path 18 is configured to include a main recirculation path 18a which is branched from the outflow path 12b of the exhaust path 12 to directly communicate with the intake system of the engine 10 and a sub recirculation path 18b which is branched from a path from the bypass path 16 to the outflow path 12b to be connected to the main recirculation path 18a so as to indirectly communicate with the intake system of the engine 10.

A first control valve 20 is installed at a branched point between the inflow path 12a of the exhaust path 12 and the bypass path 16. That is, the first control valve 20 is installed at the branched point connected to the bypass path 16 in the inflow path 12a of the exhaust path 12 to serve to control a supply amount of the exhaust gas supplied to the heat exchanger 14 through the inflow path 12a of the exhaust path 12.

In this case, the first control valve 20 is formed of a proportional control type shutoff valve which automatically controls an opening degree of a valve from the branched point between the inflow path 12a of the exhaust path 12 and the bypass path 16 toward each path depending on an operation condition of the engine.

A second control valve 22 is installed at a branched point between the outflow path 12b of the exhaust path 12 and the recirculation path 18. That is, the second control valve 22 is installed at the branched point connected to the main recirculation path 18a of the recirculation path 18 in the outflow path 12b of the exhaust path 12 to serve to control a recirculation amount of the exhaust gas again supplied to the intake system of the engine 10 among the exhaust gases discharged via the outflow path 12b of the exhaust path 12.

In this case, the second control valve 22 is formed of a proportional control type shutoff valve which automatically controls an opening degree of a valve from the branched point between the outflow path 12b of the exhaust path 12 and the main recirculation path 18a of the recirculation path 18 toward each path depending on an operation condition of the engine.

A third control valve 24 is installed at a branched point between the bypass path 16 and the recirculation path 18. That is, the third control valve 24 is installed at the branched point connected to the sub recirculation path 18b of the recirculation path 18 in the bypass path 16 to serve to control the recirculation amount of the exhaust gas again supplied to the intake system of the engine 10 among the exhaust gases discharged via the bypass path 16.

In this case, the third control valve 24 is formed of an on/off type shutoff valve which automatically controls an opening degree of a valve from the branched point between the outflow path 12b of the exhaust path 16 and the main recirculation path 18a of the recirculation path 18 toward each path depending on the operation condition of the engine.

Meanwhile, a series of control processes for the operations of each of the first control valve 20, the second control valve 22, and the third control valve 24 are automatically performed by following up a preset logic based on detection of general information related to driving such as a temperature of coolant, a temperature of various oils, etc., in addition to a start condition of the engine 10.

Figure 2:
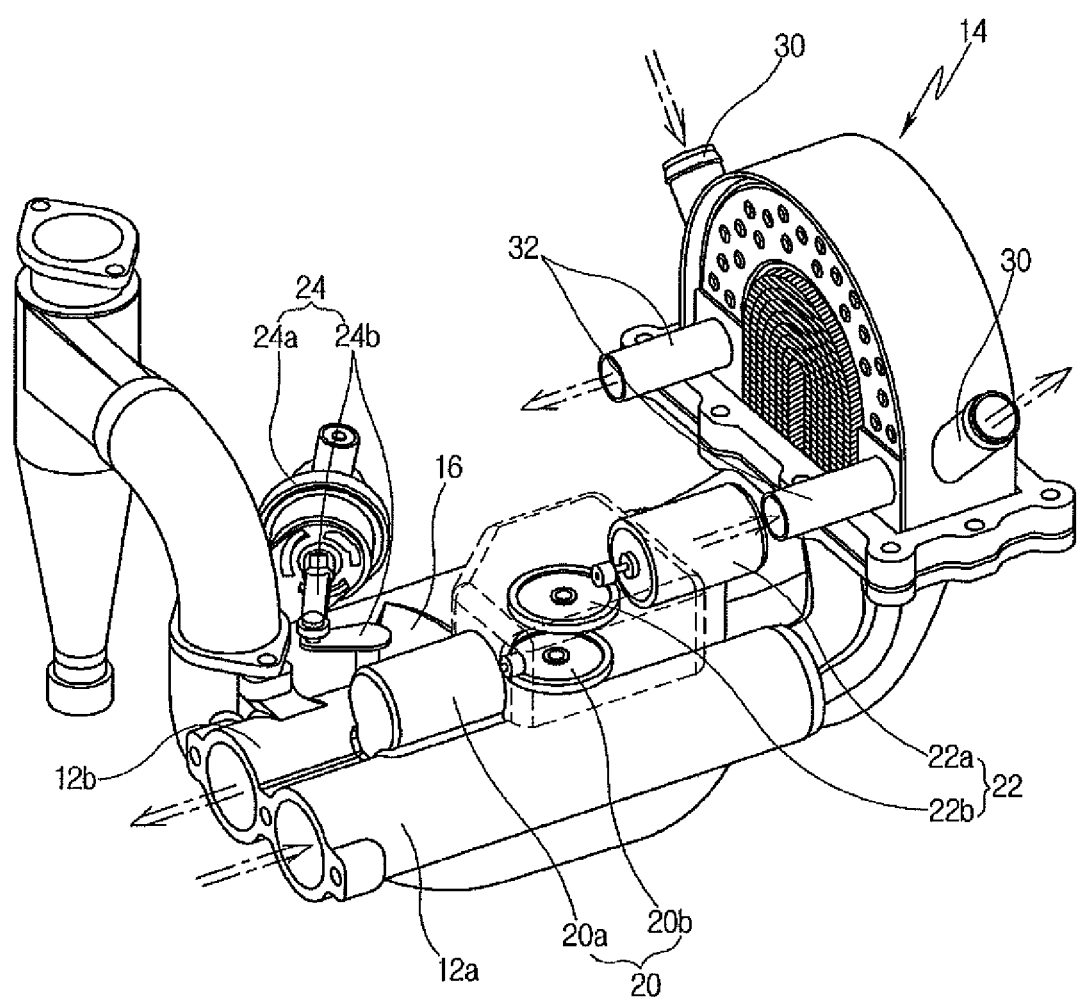
FIG. 2 is a perspective view illustrating a configuration state of main parts in the heat exchange device with combined functions in vehicles according to an exemplary embodiment of the present invention.

Referring to FIG. 2, the first control valve 20 includes an actuator 20a of a step motor which is installed at a branched point between the inflow path 12a and an inlet of the bypass path 16 in the exhaust path 12 to control a rotation angle of the valve so as to variably control an open value of a channel toward the heat exchanger 14 and a rotation member 20b which is coupled with a rotating support shaft (not illustrated) to dependently control a turning angle of a valve plate (not illustrated) positioned within the channel depending on an operation of the actuator 20a.

The second control valve 22 includes an actuator 22a of a step motor which is installed at a branched point between the outflow path 12a in the exhaust path 12 and an inlet of the main recirculation path 18a in the recirculation path 18 to control the rotation angle of the valve so as to variably control an open value of a channel toward the main recirculation path 18a of the recirculation path 18 and a rotation member 22b which is coupled with the rotating support shaft (not illustrated) to dependently control a turning angle of the valve plate (not illustrated) positioned within the channel depending on an operation of the actuator 22a.

The third control valve 24 includes a hydraulic or pneumatic actuator 24a of a step motor which is installed at a branched point between the bypass path 16 and an inlet of the sub recirculation path 18a in the recirculation path 18 to binarize an opening and closing state of a channel toward the sub recirculation path 18a of the recirculation path 18 in an on/off scheme so as to control the opening and closing state of the channel and a link member 24b which is coupled with the rotating support shaft (not illustrated) to dependently control a turning angle of the valve plate (not illustrated) positioned within the channel depending on an operation of the actuator 24a.

Figure 3:
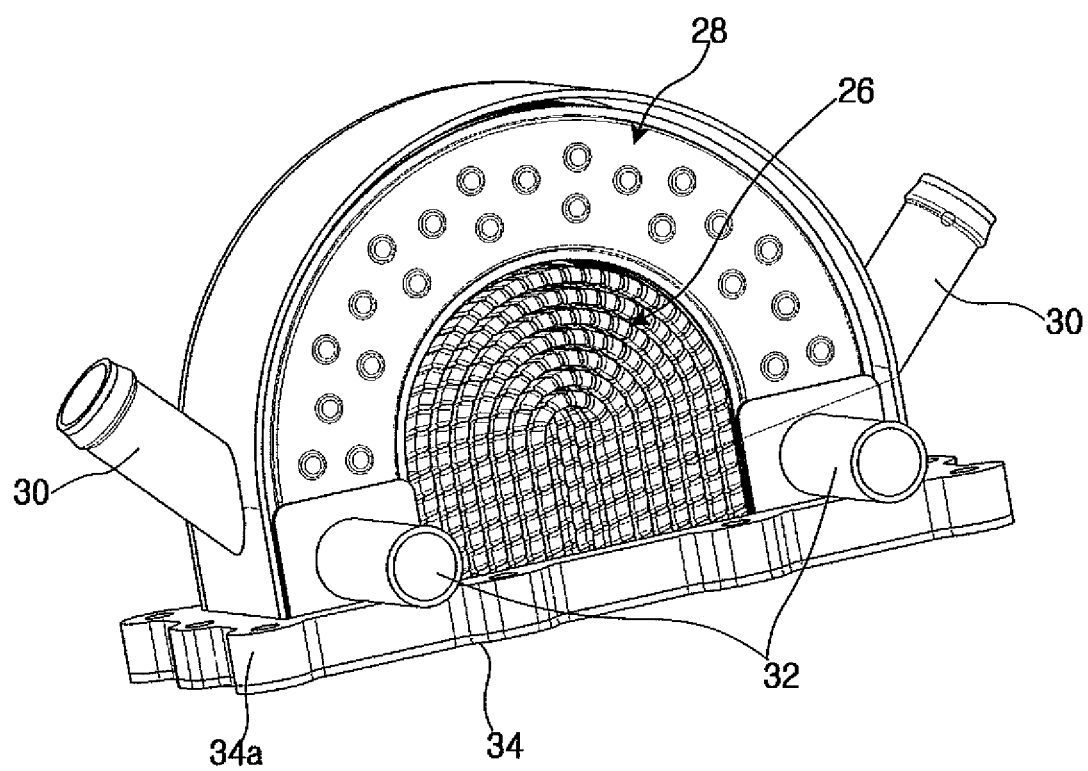
FIG. 3 is a perspective view separately illustrating the heat exchanger illustrated in FIG. 2.

Referring to FIGS. 2 and 3, respectively, the heat exchanger 14 includes a first core unit 26 which independently guides the flows of exhaust gas and coolant, respectively, to be connected to the coolant heat exchanger circuit and a second core unit 28 which independently guides the flows of coolant and oil, respectively, to be connected to the oil heat exchanger circuit.

For example, as illustrated in FIG. 3, the first core unit 26 and the second core emit 28 have approximately a U-letter shape and are positioned inside/outside a concentric circle. In this case, the heat exchanger 14 includes a pair of exhaust connection parts (not illustrated) for re-circulation of the exhaust gas which is performed through the outflow path 12b of the exhaust path 12 and the recirculation path 18, along with the introduction of exhaust gas through the inflow path 12a of the exhaust path 12, a pair of coolant connection parts 30 for inflow and outflow of coolant between the pair of coolant connection parts 30 and the engine 10, and a pair of oil connection parts 32 for inflow and outflow of oil between the engine 10 and/or the transmission (not illustrated).

Here, the exhaust connection part is finished by an end cap 34 which has an edge of a bottom portion integrated with a flange 34a to be tightly coupled with the exhaust path 12 while forming a connection port (not illustrated) at a bottom portion of the first core unit 26 for communicating with the inflow path 12a and the outflow path 12b in the exhaust path 12.

Further, the coolant connection parts 30 are installed to face each other while being spaced apart from each other at left and right ends of an outer side of edges on the second core unit 28 and the oil connection parts 32 are installed to be spaced apart from each other at separate positions from the coolant connection parts 30 with respect to the second core unit 28.

Figure 4:
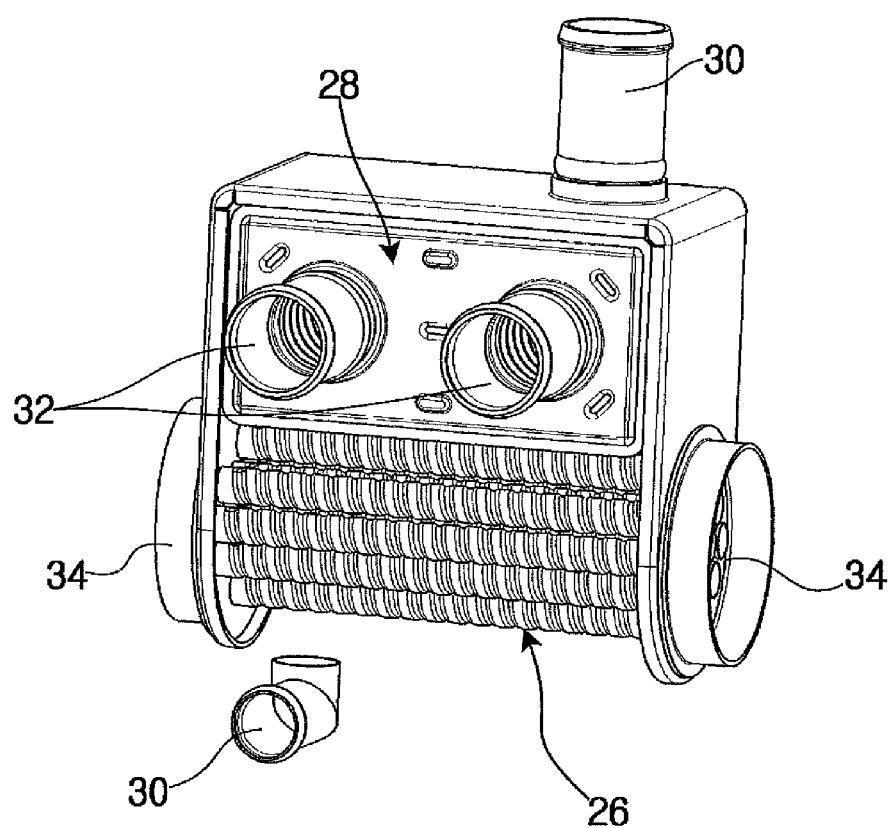
FIG. 4 is perspective view illustrating another example of the heat exchanger illustrated in FIG. 3.

According to another exemplary embodiment of the present invention, the heat exchanger 14 has an i-letter shape as illustrated in FIG. 4 in terms of the overall appearance. That is, the first core unit 26 for exchanging heat between the exhaust gas and the coolant is disposed at a lower portion and the second core unit 28 for exchanging heat between the coolant and the oil is disposed on the first core unit in a laminar shape.

In this case, the coolant connection parts 30 for inflow and outflow of the coolant are provided at the upper and lower portions of the heat exchanger 14, the oil connection parts 32 for inflow and outflow of oil are provided at positions each spaced apart from the second core unit 28 positioned at the upper portion thereof, and the pair of exhaust connection parts (not illustrated) are finished by the end cap 34 to be tightly coupled with the exhaust path 12 while being provided at both of the left/right ends of the first core unit 26 positioned at the lower position thereof for recirculation of exhaust gas.

Meanwhile, in the heat exchange device with combined functions in vehicles having the foregoing configuration, the discharge path and the recirculation path of the exhaust gas will be described below in detail.

Figure 5:
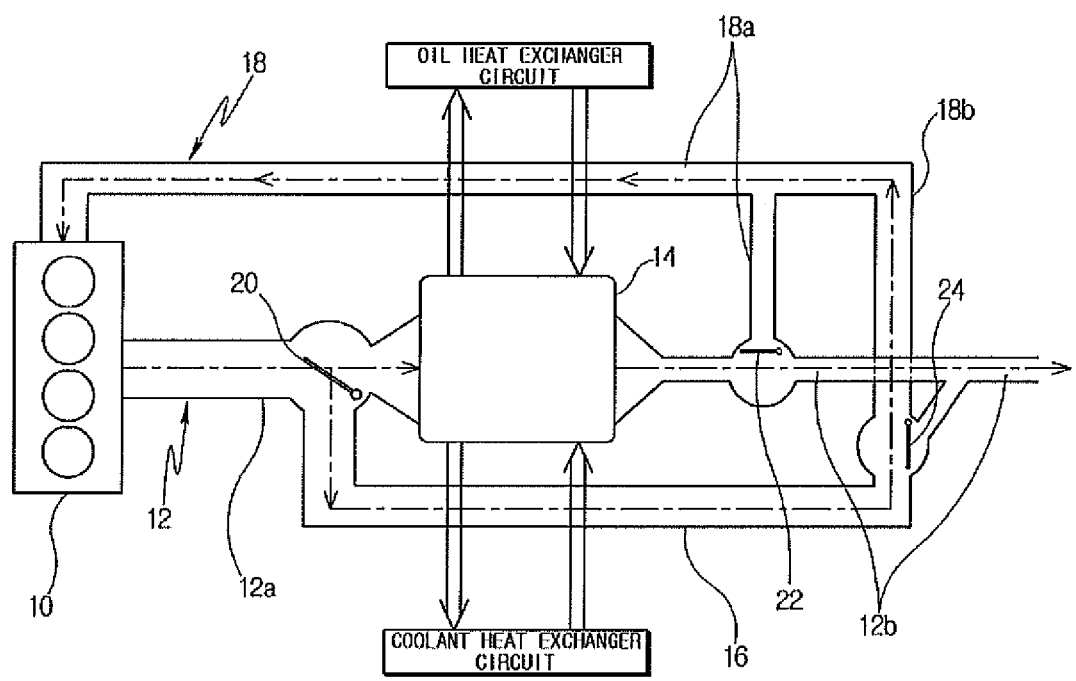
FIGS. 5 to 9 each are diagrams illustrating a change in flow path of exhaust gas involved by a variable control depending on an operation state of an engine in a heat exchange device with combined functions in vehicles according to an exemplary embodiment of the present invention.

Referring to FIG. 5, when the recirculation of the exhaust gas is required at the time of cold start, the first control valve 20 controls the open value of the valve reaching the heat exchanger 14 via the inflow path 12a of the exhaust path 12 to be in a range from approximately 50 to 99%, the second control valve 22 controls the flow path of the exhaust gas reaching the main recirculation path 18a of the recirculation path 18 via the outflow path 12b of the main path 12 to be completely shut off, and the third control valve 24 controls the flow path toward the outflow path 12b of the exhaust path 12 via the bypass path 16 to be completely shut off.

That is, the first control valve 20 dependently controls the opening degree of each path within a predetermined range while opening the path reaching the heat exchanger 14 and the bypass path 16 via the inflow path 12a of the exhaust path 12, the second control valve 22 opens only the flow path discharged into the atmosphere via the outflow path 12b of the exhaust path 12, and the third control valve 24 opens only the flow path reaching the main recirculation path 18a via the sub recirculation path 18b of the recirculation path 18 through the bypass path 16.

Therefore, the flow path of the exhaust gas through the exhaust path 12 is set to be re-supplied to the engine 10 through the sub recirculation path 18b and the main recirculation path 18a of the recirculation path 18 via the bypass path 16 while being set to be toward the outflow path 12b via the heat exchanger 14. In this process, the coolant and the oil are in a state that they are not yet heated.

Figure 6:
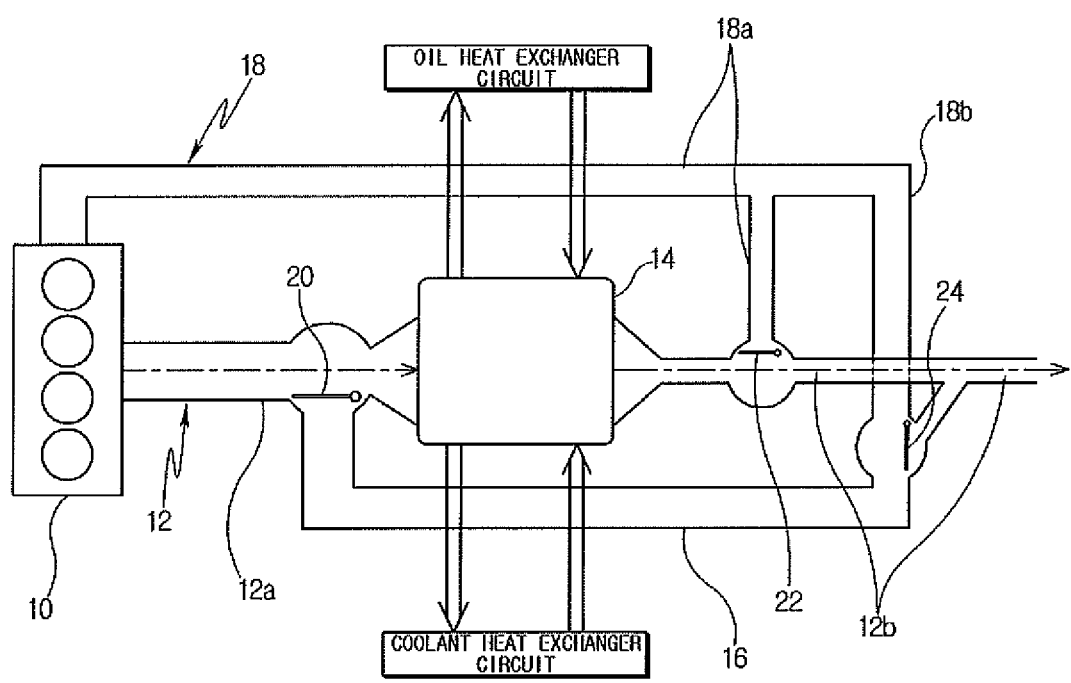

Referring to FIG. 6, when the recirculation of the exhaust gas is unnecessary at the time of the cold start, the first control valve 20 is branched from the inflow path 12a of the exhaust path 12 to control the flow path of the exhaust gas reaching the bypass path 16 to be completely shut off, the second control valve 22 controls the flow path of the exhaust gas reaching the main recirculation path 18a of the recirculation path 18 via the outflow path 12b of the exhaust path 12 to be completely shut off, and the third control valve 24 controls the flow path toward the outflow path 12b of the exhaust path 12 via the bypass path 16 to be completely shut off.

That is, the first control valve 20 opens only the path reaching the heat exchanger 14 through the inflow path 12a of the exhaust path 12, the second control valve 22 opens only the flow path discharged into the atmosphere through the outflow path 12b of the exhaust path 12, and the third control path 24 opens only the flow path reaching the main recirculation path 18a via the sub recirculation path 18b of the recirculation path 18 through the bypass path 16, but the exhaust gas is not supplied to the bypass path 16 by the opening and closing operation of the first control valve 20 such that exhaust gas does not flow through the recirculation path 18.

Therefore, the flow path of the exhaust gas through the exhaust path 12 is set to be toward only the outflow path 12b via the heat exchanger 14, and thus both of the flow paths through the bypass path 16 and the recirculation path 18 are shut off. In this process, the coolant and the oil are in a state that they are not yet heated.

Figure 7:
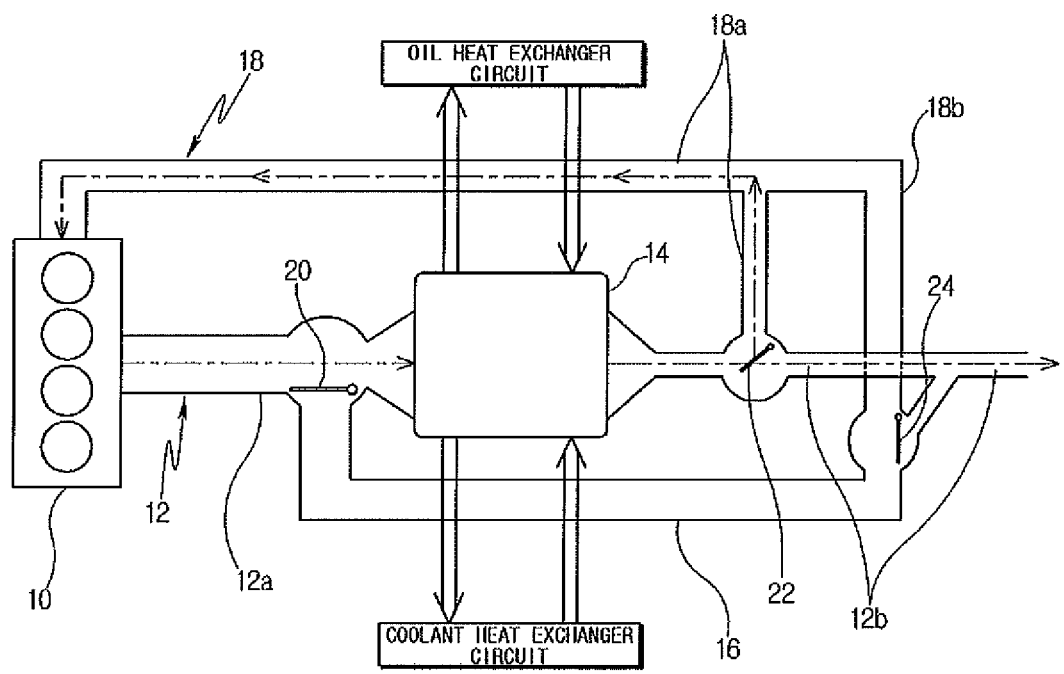

Referring to FIG. 7, when the recirculation of the exhaust gas is required in the state after which a predetermined time lapses after the cold start, the first control valve 20 controls the flow path of the exhaust gas reaching the bypass path 16 via the inflow path 12a of the exhaust path 12 to be completely shut off, the, the second control valve 22 controls the open value of the valve reaching the recirculation path 18 via the outflow path 12b of the exhaust path 12 to be in a range from approximately 50 to 99%, and the third control valve 24 controls the flow path toward the outflow path 12b of the exhaust path 12 via the bypass path 16 to be completely shut off.

That is, the first control valve 20 opens only the flow path toward the heat exchanger 14 through the inflow path 12b of the exhaust path 12, the second control valve 22 dependently controls the opening degree of each path within a predetermined range while simultaneously opening the path reaching the recirculation path 18 through the outflow path 12b of the exhaust path 12 and the flow path discharged into the atmosphere through the outflow path 12b, and the third control valve 24 opens only the flow path reaching the main recirculation path 18a via the sub recirculation path 18b of the recirculation path 18 through the bypass path 16.

Therefore, the flow path of the exhaust gas through the exhaust path 12 is set to be re-supplied to the engine 10 through the main recirculation path 18a of the recirculation path 18 while being set to be toward the outflow path 12b via the heat exchanger 14. In this process, the coolant and the oil are in a state that they are not heated.

Further, when the recirculation of the exhaust gas is unnecessary in the state in which the predetermined time lapses after the cold start, the first control valve 20, the second control valve 22, and the third control valve 24 are individually controlled. This process is in the same state as FIG. 6, and therefore the detailed description thereof will be omitted.

Figure 8:
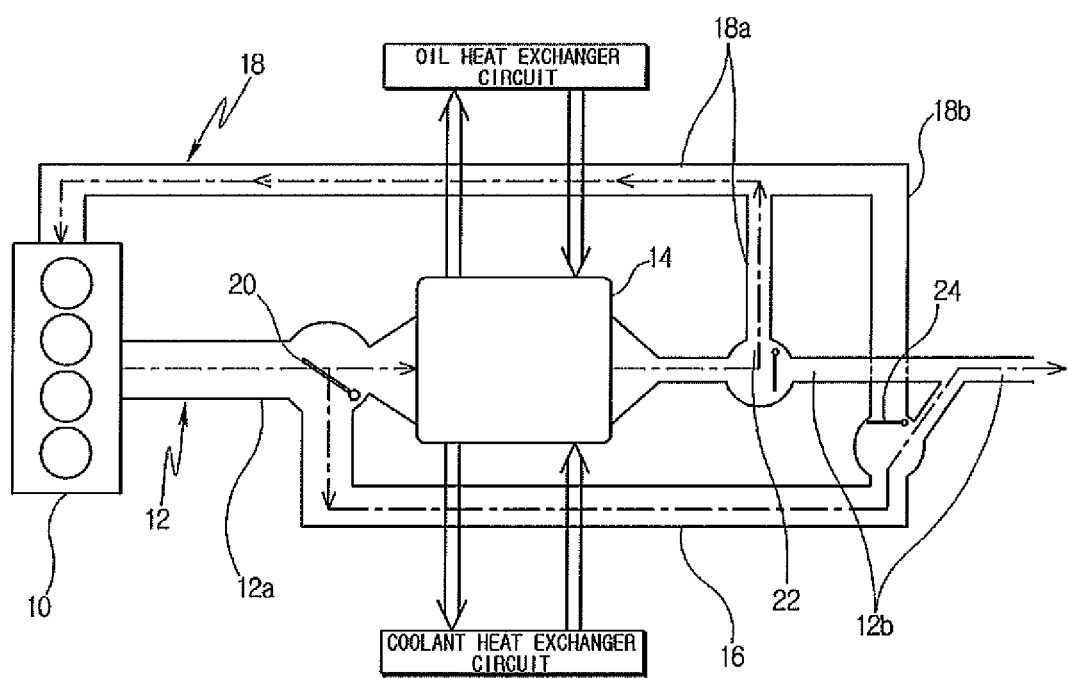

Referring to FIG. 8, when the recirculation of the exhaust gas is required in the state in which the heating of the coolant is made to some extent due to the lapse of the predetermined time after the cold start, the first control valve 20 controls the open value of the valve reaching the heat exchanger 14 via the inflow path 12a of the exhaust path 12 to be in a range from approximately 50 to 99%, the second control valve 22 controls the flow path of the exhaust gas reaching the atmosphere via the outflow path 12b of the exhaust path 12 to be completely shut off, and the third control valve 24 controls the flow path of the exhaust gas reaching the sub recirculation path 18b of the recirculation path 18 via the bypass path 16 to be completely shut off.

That is, the first control valve 20 dependently controls the opening degree of each path within a predetermined range while opening the path reaching the heat exchanger 14 and the bypass path 16 via the inflow path 12a of the exhaust path 12, the second control valve 22 opens only the path reaching the recirculation path 18 through the outflow path 12b of the exhaust path 12, and the third control valve 24 opens only the flow path reaching the atmosphere via the outflow path 12b of the exhaust path 12 through the bypass path 16.

Therefore, the flow path of the exhaust gas through the exhaust path 12 is set to be discharged into the atmosphere via the bypass path 16 while being set to pass through the heat exchanger 14 and then to be toward the engine through the recirculation path 18. In this process, the coolant is in the state in which it is heated to some extent but the oil is in the state in which it is not yet heated.

Figure 9:
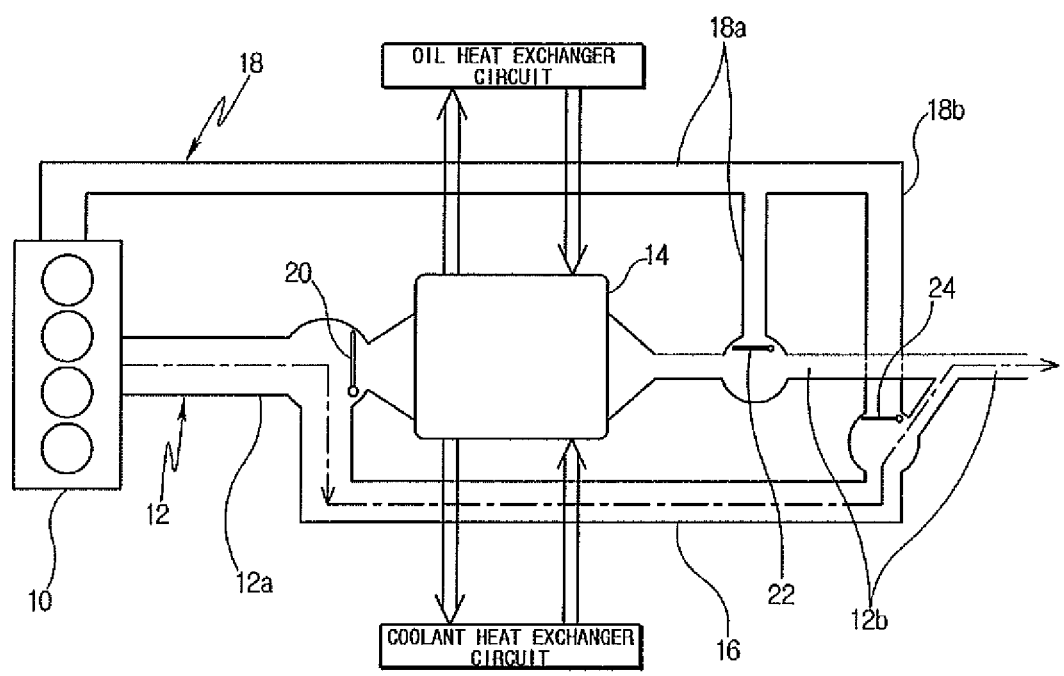

Referring to FIG. 9, when the recirculation of the exhaust gas is unnecessary in the state in which the heating of the coolant is made to some extent due to the lapse of the predetermined time after the start, the first control valve 20 controls the flow path of the exhaust gas reaching the heat exchanger 14 via the inflow path 12a of the exhaust path 12 to be completely shut off, the second control valve 22 controls the flow path of the exhaust gas reaching the recirculation path 18 via the outflow path 12b of the exhaust path 12 to be completely shut off, and the third control valve 24 controls the flow path of the exhaust gas reaching the recirculation path 18 via the bypass path 16 to be completely shut off.

That is, the first control valve 20 opens only the flow path toward the bypass path 16 through the inflow path 12a of the exhaust path 12, the second control valve 22 opens only the flow path reaching the atmosphere through the outflow path 12b of the exhaust path 12, and the third control valve 24 opens only the path reaching the atmosphere via the outflow path 12b of the exhaust path 12 through the bypass path 16.

Therefore, the flow path of the exhaust gas through the exhaust path 12 is set to directly reach the atmosphere via the bypass path 16, not via the heat exchanger 14 and the recirculation path 18. In this process, the coolant is in the state in which it is heated to some extent but the oil is in the state in which it is not yet heated.

Meanwhile, when the recirculation of the exhaust gas is required or unnecessary in the state in which both of the coolant and the oil are heated to some degree due to the lapse of the predetermined time after the start, the operation states of the first control valve 20, the second control valve 22, and the third control valve 24 each are the same as FIGS. 8 and 9 and therefore the detailed description thereof will be omitted.

Further, when the driver wants to accelerate while driving, the operation states of the first control valve 20, the second control valve 22, and the third control valve 24 are the same as FIG. 9 and therefore the detailed description thereof will be omitted.

Although the exemplary embodiments of the present invention have been disclosed with reference to the accompanying drawings, the present invention is not limited thereto but may be changed and modified in various forms by a person skilled in the art to which the present invention pertains within the technical scope of the present invention and equivalent scope to claims to be described below.

INDUSTRIAL APPLICABILITY

The present invention relates to a heat exchange device with combined functions in vehicles, and more particularly, to a heat exchanger with combined functions in vehicles capable of improving assembling workability and economic efficiency by integrating a heat exchanger of an exhaust gas recirculation, a heat exchanger of a water-cooled oil cooler, and a heat exchanger of an exhaust heat recovery system in a single package and appropriately disposing an exhaust path of exhaust gas and flow paths for coolant and oil, respectively, to meet these heat exchangers to publicly use related parts.

The invention claimed is:

1. A heat exchange device with combined functions in a vehicle, comprising:
   a heat exchanger installed in an exhaust path of an engine and connected to a coolant heat exchanger circuit and an oil heat exchanger circuit, wherein the exhaust path includes an inflow path extending from the engine to the heat exchanger and an outflow path extending from the heat exchanger to a tail pipe;
   a bypass path configured to bypass the heat exchanger in the exhaust path, wherein the bypass path extends from the inflow path to the outflow path;
   a recirculation path branched from the exhaust path to connect to an intake system of the engine, wherein the recirculation path includes a main recirculation path branching from the outflow path and a sub recirculation path extending from the bypass path to the main recirculation path;
   a first control valve configured to control a flow of an exhaust gas between the exhaust path and the bypass path;
   a second control valve configured to control a flow of the exhaust gas between the exhaust path and the recirculation path; and
   a third control valve configured to control a flow of the exhaust gas between the bypass path and the recirculation path, wherein the third control valve is disposed at a branch point between the bypass path and the sub recirculation path, wherein the third control valve closes a flow path toward the outflow path via the bypass path when the third control valve opens a flow path reaching the sub recirculation path via the bypass path, and wherein the third control valve closes the flow path reaching the sub recirculation path via the bypass path when the third control valve opens the flow path toward the outflow path via the bypass path.

2. The heat exchange device of claim 1, wherein the first control valve is disposed at a branch point between the inflow path and the bypass path.

3. The heat exchange device of claim 2, wherein the second control valve is disposed at a branch point between the outflow path and the recirculation path.

4. The heat exchange device of claim 1, wherein the second control valve is disposed at a branch point between the outflow path and the main recirculation path.

5. The heat exchange device of claim 1, wherein the heat exchanger includes:
   exhaust connection parts providing an exhaust gas inflow and an exhaust gas outflow;
   coolant connection parts providing a coolant inflow and a coolant outflow; and
   oil connection parts providing an oil inflow and an oil outflow.

6. The heat exchange device of claim 5, wherein the heat exchanger includes:
   a first core unit configured to be connected to the coolant heat exchanger circuit; and
   a second core unit configured to be connected to the oil heat exchanger circuit.

7. The heat exchange device of claim 6, wherein the first core unit and the second core unit are arranged concentrically.

8. The heat exchange device of claim 7, wherein the exhaust connection parts include an end cap having an edge portion integrated with a flange, the end cap formed at a bottom portion of the first core unit, wherein the coolant connection parts are disposed at opposite ends of an outer side of the second core unit, and wherein the oil connection parts are disposed at portions spaced apart from the coolant connection parts with respect to the second core unit.

9. The heat exchange device of claim 6, wherein the first core unit and the second core unit are each disposed in a laminar shape in a vertical direction.

10. The heat exchange device of claim 9, wherein the exhaust connection parts include end caps disposed at opposite ends of the first core unit, wherein the coolant connection parts are disposed at a lower portion of the first core unit and an upper portion of the second core unit, and wherein the oil connection parts are disposed at portions of the second core unit spaced apart from each other.

* * * * *